Nov. 12, 1968 L. BUDTS 3,411,022

LOGICAL CIRCUITS

Filed March 5, 1965 7 Sheets-Sheet 1

Lucien Budts
INVENTOR.

BY Karl F. Ross
Attorney

Nov. 12, 1968 L. BUDTS 3,411,022

LOGICAL CIRCUITS

Filed March 5, 1965 7 Sheets-Sheet 2

Lucien Budts
INVENTOR.

BY Karl G. Ross
Attorney

Nov. 12, 1968 L. BUDTS 3,411,022

LOGICAL CIRCUITS

Filed March 5, 1965 7 Sheets-Sheet 3

Lucien Budts
INVENTOR.

BY Karl G. Ross
Attorney

Lucien Budts
INVENTOR.

BY Karl F. Ross
Attorney

Lucien Budts
INVENTOR.

BY Karl G. Ross
Attorney

Lucien Budts
INVENTOR.

BY Karl F. Ross
Attorney

Lucien Budts
INVENTOR.
BY Karl G. Ross
Attorney

United States Patent Office 3,411,022

Patented Nov. 12, 1968

3,411,022

LOGICAL CIRCUITS

Lucien Budts, Paris, France, assignor to Thomson Automatismes, Chatou, France, a corporation of France Filed Mar. 5, 1965, Ser. No. 437,494
Claims priority, application France, Mar. 18, 1964, 967,850
10 Claims. (Cl. 307—288)

ABSTRACT OF THE DISCLOSURE

A signal intensifier for logical circuitry includes a bridge network of passive resistance elements connected between opposite terminals of a direct-current source in series with a Zener diode which normally biases the second stage of a two-stage transistor amplifier to cutoff but which allows saturation of that stage upon the triggering of an associated first stage, connected across a diagonal of the bridge, by an input signal applied to the junction of a resistor and another diode in one of the bridge arms to block current flow through the last-mentioned diode. A feedback resistor regeneratively connected between the two stages accelerates the switchover from cutoff to saturation and vice versa.

The present invention relates to logical circuits and chiefly to those arranged in compact units.

Conventional logical circuits of the prior art and arranged, according to known methods, in modules, suffer from certain drawbacks. These modules comprise but two stages in cascade connection of AND and OR circuits followed by a regenerative circuit restoring the amplitude of the output signal to a suitable level. To elaborate a logical equation of relative complexity by utilising said modules it is necessary either to use a plurality of similar "modules" in the logical design or to introduce in a single module a high number of diodes which become prohibitive and expensive. Furthermore, the operation of such conventional logical circuits is not quite safe, mainly in the case of breakings of the supply leads or of the information-carrying leads, such breakings resulting in most cases in the occurrence of an information signal which did not exist in the information available at the input of the logical circuit.

The present invention has for an object the provision of a logical design obviating the above-mentioned shortcomings.

Another object of the invention is the provision of a transistorized logical circuit, called "regenerative element" or signal intensifier, designed to amplify an information signal of logical value or binary state "1" which is represented by a voltage of a given sign with respect to a reference voltage, and also to deliver as an output signal the alternate binary state or logical value "0" should one of the following conditions occur:

(1) information signal of logical value "0" at the input of the circuit,
(2) breaking of or failure in one of the supply leads.

Another object of the invention is the provision of a logical assembly comprising a plurality of stages alternately made of AND and OR circuits, each of them consisting of diodes and resistors only, the last stage of said logical assembly being connected to a regenerative element whose output represents the result of the logical equation embodied by said assembly.

Another object of the invention is the provision of a feedback circuit connecting the output of the regenerative element to its input so as to convert the progressive variation, in either sense, of the information signal applied to the input into a sharp passage of the output signal from the logical value "0" to the logical value "1" or vice versa.

The outstanding advantage of said logical assembly is that it can be realized in the form of a printed circuit of small dimensions.

The various features, objects and advantages of the invention will be readily understood from the following description of several exemplary embodiments illustrated in the accompanying drawing in which.

Figure 5A:
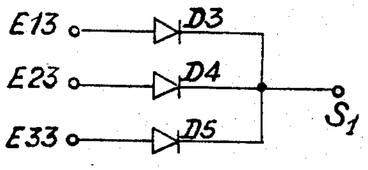
Figure 5B:
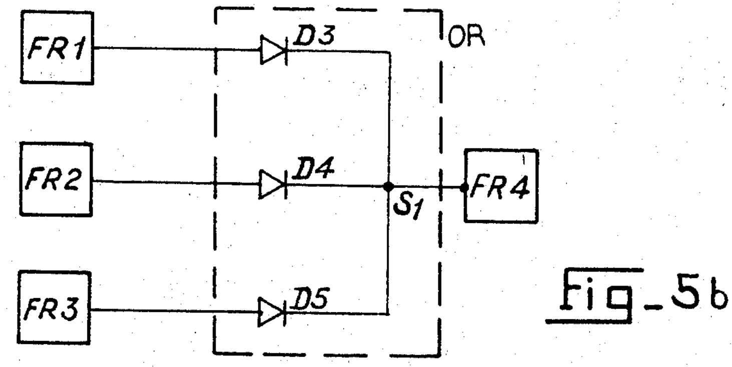
Figure 6A:
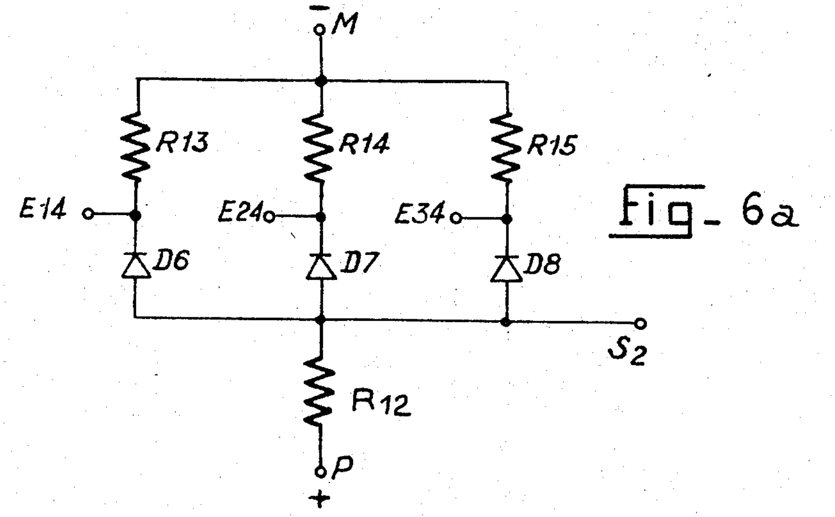
Figure 6B:
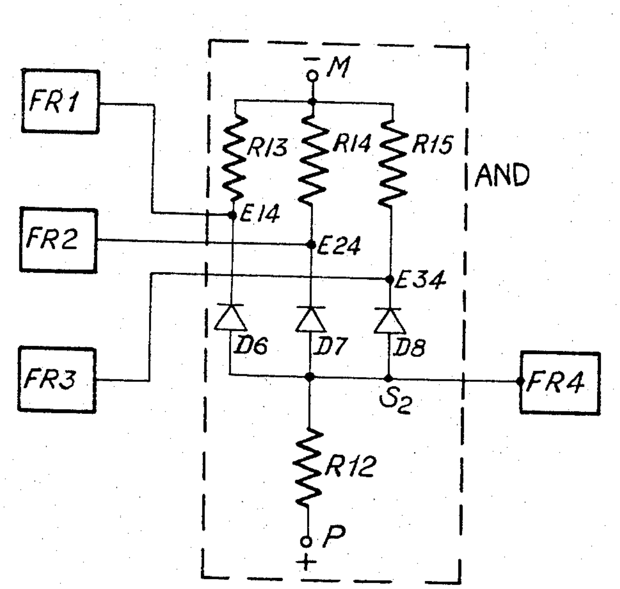
Figure 7:
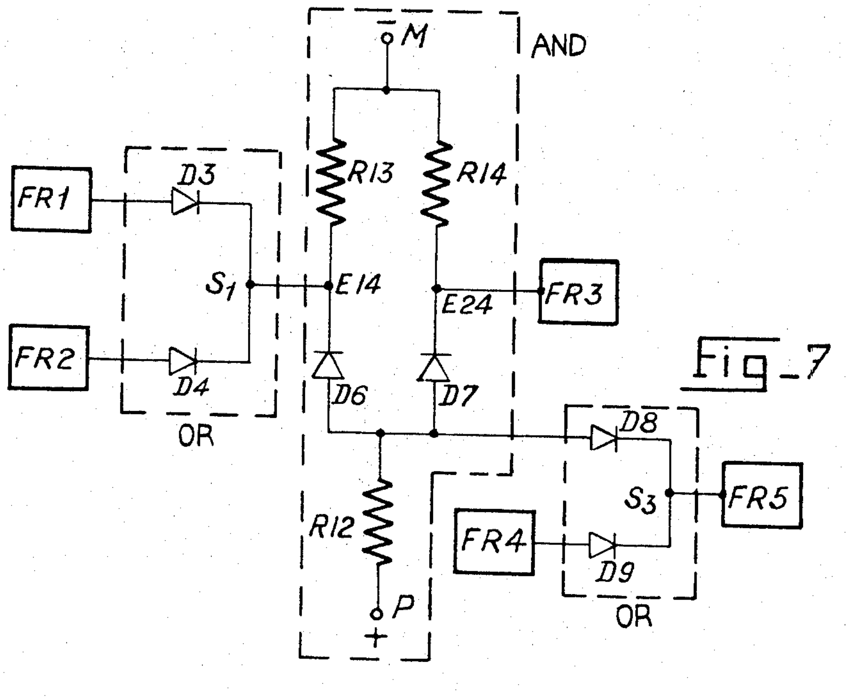
Figure 8:
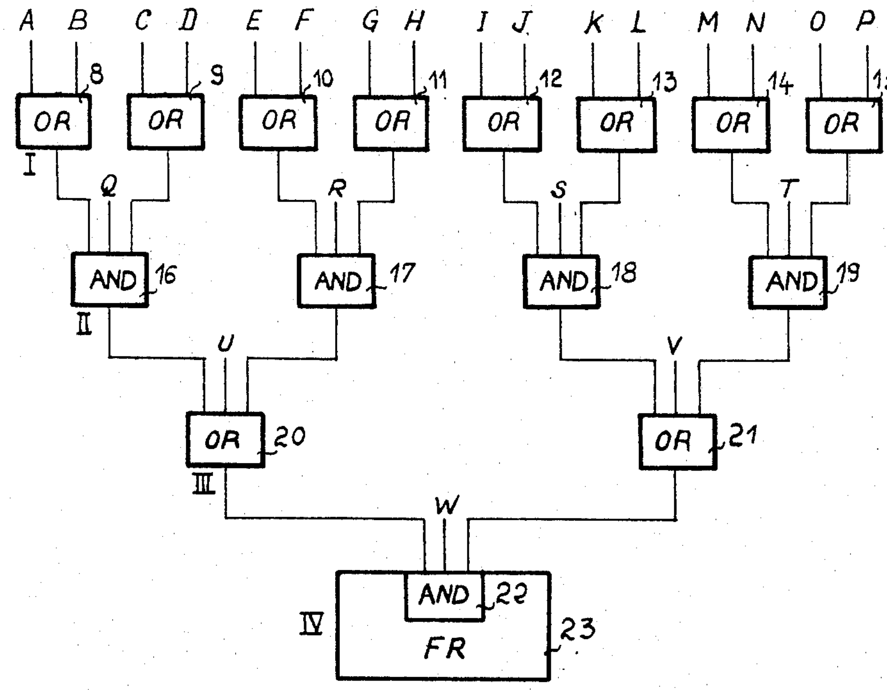
Figure 9:
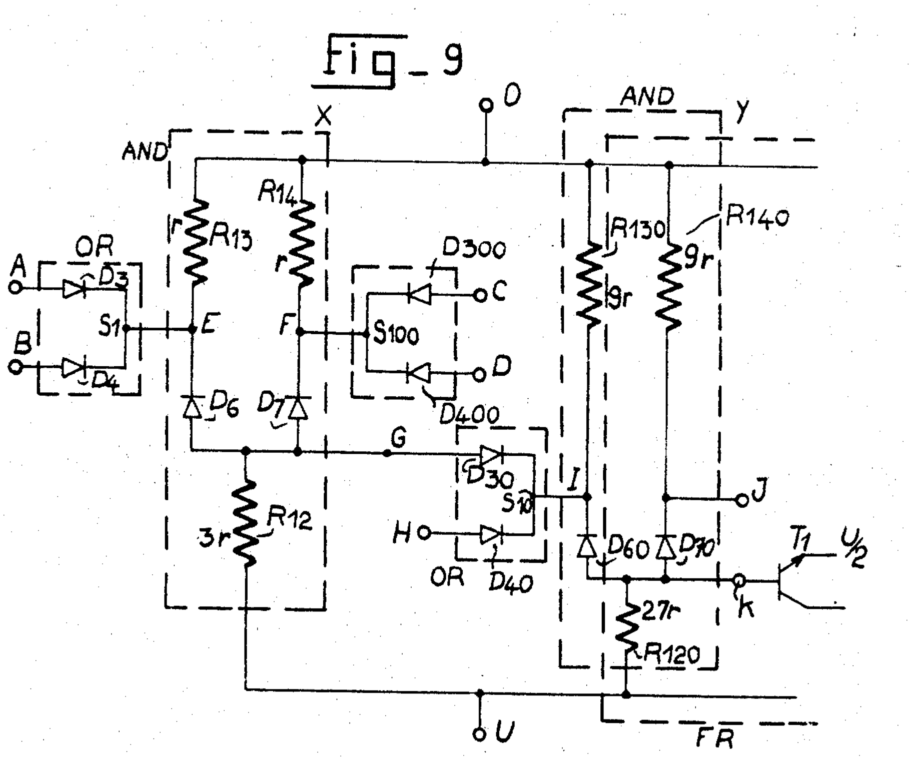
Figure 10:
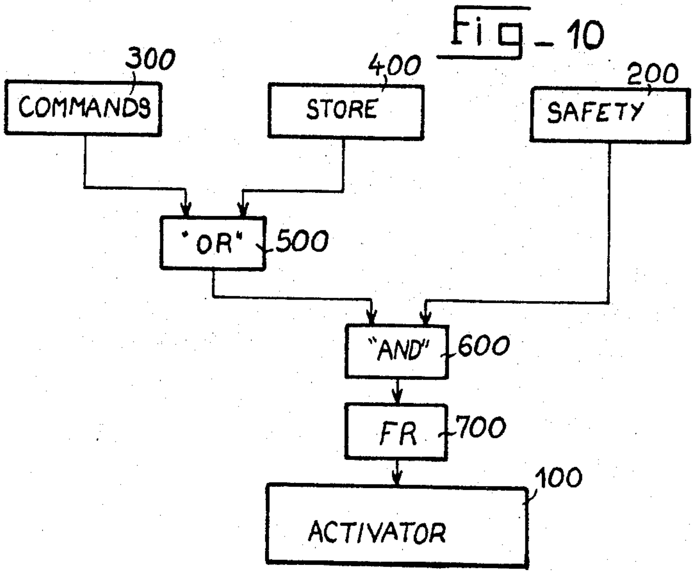

FIGS. 5*a* and 5*b* show a combination of several regenerative elements through an OR circuit;

FIGS. 6*a* and 6*b* show a combination of several regenerative elements through an AND circuit;

FIG. 7 is a diagram of a logical design utilizing the preceding AND and OR circuits in cascade connection;

FIG. 8 is a diagram of a logical assembly built in accordance with the principles of the invention;

FIG. 9 is a particular embodiment of a logical design according to the invention; and FIG. 10 is a schematic diagram of the control of an activator by means of a logical design in accordance with the principles of the invention.

Figure 1:
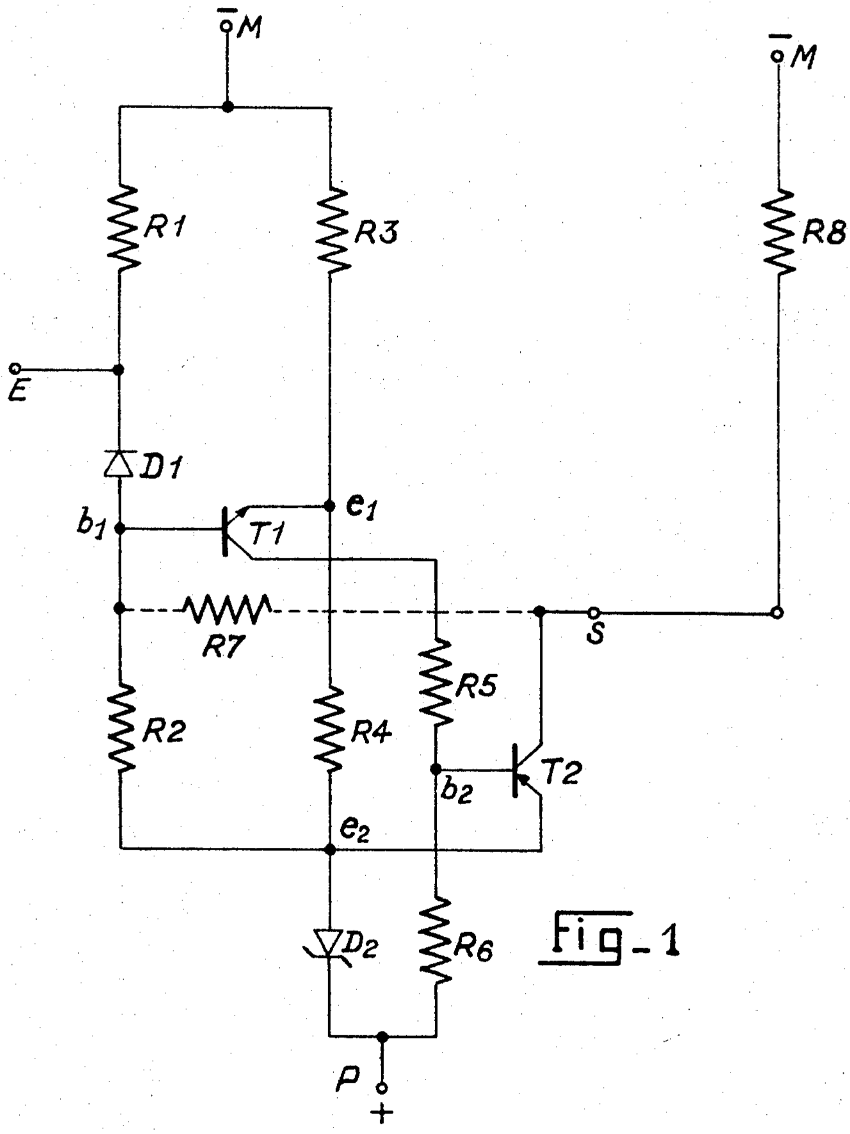
FIG. 1 is a diagram of a simple regenerative element.

In FIG. 1, the arrangement showing the regenerative element comprises two transistors, T1 of the NPN type and T2 of the PNP type. The input of the element is E and the output is S. The information or control signal which in the example, is chosen of positive polarity, is applied at E. References P and M designate positive and negative terminals respectively of potential sources, but a single source may be used for providing these potentials. A Zener or breakdown diode D2 is connected to terminal P by its cathode; its anode, i.e. point *e*2, is at a fixed potential, which is lower than the positive bias potential at point P. This breakdown diode may be replaced by an ordinary diode connected in its reverse direction. When no signal is applied to input terminal E, current flows through a diode D1 having its anode connected to point *b*1, that is, to the base of transistor T1, and its cathode to the input terminal E. The branch comprising resistor R1, diode D1 and resistor R2 connected between terminal M and point *e*2 sets to a determined value the potential of point *b*1, which is connected to the anode of diode D1 and to the base of transistor T1 whose emitter electrode is connected to terminal *e*1. The potential of said terminal is set by means of the resistors R3 and R4, R3 being connected between M while *e*1 and R4 lies between *e*1 and *e*2. The respective values of the pairs of resistors R1–R2 and R3–R4 are so chosen as to set the potential of *e*1 to a higher value than that of point *b*1. Transistor T1 is then blocked and the current flow through its collector is very small, said collector being connected to the positive terminal P through resistors R5 and R6. Under these conditions the potential of point *b*2 is slightly less than that of terminal P. As the emitter electrode of transistor T2 is connected to point *e*2, the base electrode of T2 is positive with respect to the emitter, and transistor T2 is also blocked. The drop of potential across resistor R8 which is connected between terminals M and S is then substantially zero. The regenerative element has the logical value "0."

Conversely, if a positive signal carrying an information is applied to input terminal E, diode D1 blocks and a positive base emitter bias is established on transistor T1 through resistor R2. Transistor T1 is then saturated. The voltage drop across resistor R6 caused by the current flow through the collector electrode of transistor T1 increases and establishes a negative bias on the base of T2 with respect to its emitter electrode, thereby driving transistor T2 to its saturation state. The potential at terminal S is now substantially identical with that at *e*2. The voltage drop across resistor R8 is at a maximum and the regenerative element has the logical value "1."

If the signal which is applied to input terminal E is slowly varying, for instance from zero to a positive value, the regenerative element is instantly switched to its alternate state by the blocking of diode D1.

The signal intensifier of FIG. 1 can be regarded as a resistance bridge with arms R1+D1, R2, R3 and R4, diagonally opposite junctions *b*1 and *e*1 being connected to respective input electrodes (base and emitter) of transistor T1 which forms the first stage of a two-stage amplifier. The other two junctions M and *e*2 can be regarded as connected to opposite terminals of a direct-current source, with interposition of the reverse-poled Zener diode D2 between one source terminal P and the associated junction *e*2 as a biasing impedance for transistor T2. This Zener diode is seen to be shunted by the input circuit *b*2, *e*2 of the second transistor stage T2 and its associated biasing resistor R6, forming part of the voltage divider R5, R6, in series with the first transistor stage T1. It is evident that, in the absence of an input signal, the potential of base terminal *b*2 is that of terminal P and is therefore more positive than that of emitter terminal *e*2 so that transistor T2 remains cut off until the bias at its base is changed by the conduction of transistor T1 which is triggered in the aforedescribed manner by voltage on terminal E. Once conduction is established, the resistance of diode D2 must of course be low enough to permit the transistor T2 to attain its above-mentioned state of saturation.

Figure 2:
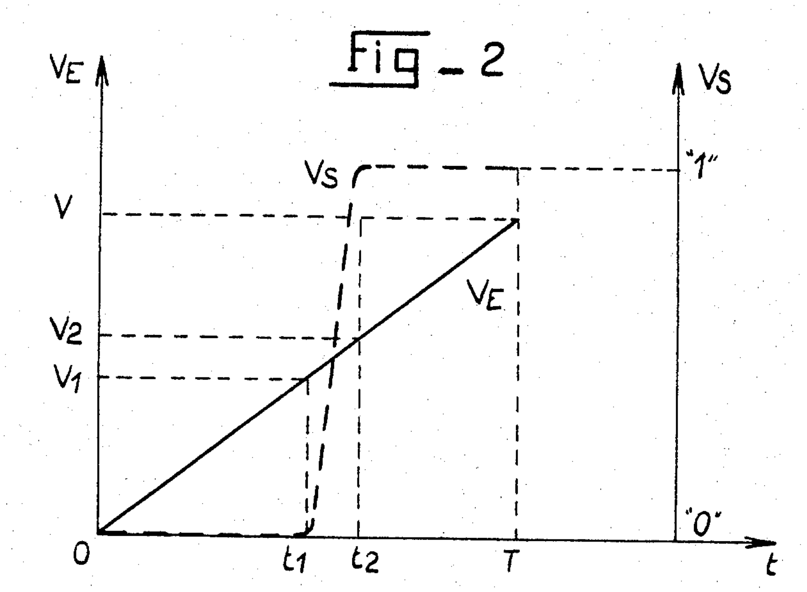
FIG. 2 shows the passage of the regenerative element from logical value "0" to the logical value "1"

FIG. 2 illustrates this switchover by plotting the voltage VE with respect to the time. It is assumed that the voltage VE applied to terminal E is varied from zero to a value V, and that this variation is linear between instants O and T. At the beginning, diode D1 conducts and the potential VE is transferred to point *b*1, whose potential therefore increases. When this potential VE reaches the value of the potential at point *e*1, i.e. V1 at instant *t*1, the transistor T1 begins to conduct. Potential VE is then still increasing till it reaches, at time *t*2, the value V2 at which diode D1 is no longer conductive, driving transistor T1 to its saturation state.

The switchover of the regenerative element from one state to another occurs during the short interval *t*1–*t*2 during which the output voltage VS (see FIG. 2) is varied across resistor R8, the output signal being switched from the logical value "0" to the logical value "1."

Figure 3:
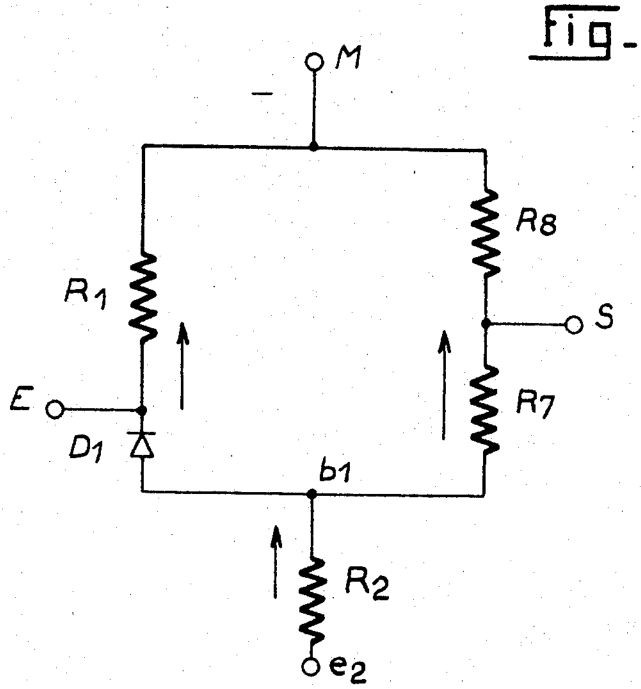
FIG. 3 is a simplified diagram of the regenerative element.

The dotted—line connection in FIG. 1 represents a resistor R7 which, inserted between terminals S and *b*1, establishes a feed-back circuit between the output and the input of the regenerative element and changes the regenerative element to a flip-flop so that this element cannot be maintained permanently in either logical state "0" and "1." As a matter of fact, when there is no information signal applied to the input E, there exists in resistor R2 a current which is the sum of the two currents through resistor R1 and through resistors R7 and R8 in series since then the transistor T2 does not conduct. The simplified diagram of FIG. 3 illustrates how the current flowing through resistor R2 is generated. The base electrode of transistor T1, that is point *b*1, is at a negative potential with respect to the emitter electrode of transistor T1, that is point *e*1. When a progressively increasing positive signal is applied to input E, diode D1 remains conductive as long as the signal at E remains substantially small, and the potential of *b*1 increases. With a certain value of the potential of *b*1, the base electrode of transistor T1 becomes positive with respect to its emitter, establishing a current flow through the collector of the transistor, said current flow biasing the base electrode of transistor T2, thereby establishing a current flow through the collector of the latter transistor. This current flow causes an increase of the current through resistor R8 and hence an increase of the potential at terminal S. The voltage drop across resistor R7 decreases, causing a decrease of the current flow through this resistor and hence a decrease of the current flow through R2, and the potential at *b*1 increases. This increase of the potential of *b*1 produces a new increase of the current flow through the collector electrode of transistor T1 and also of the collector current of transistor T2, causing a further increase of the potential at S, and this process will continue till transistors T1 and T2 come to saturation. When the regenerative element changes its state, the current flow through resistor R7 reverses, going from S towards *b*1, thus supplementing current flow through R2 towards *b*1. In that case, the reaction which is introduced by resistor R7 creates, with suitable dimensioning of said resistor, a breakdown effect which provokes, for a very short while and independently of the input signal, a switchover of the regenerative element to state 1 as soon a sit departs from state zero.

The reverse change of state occurs in the same manner as above when the input signal decreases so as to render diode D1 conductive again. As soon as diode D1 begins again to conduct, the voltage decrease at E is transferred to point *b*1, the potential of which decreases. When decreasing, this potential of *b*1 passes through a value at which the transistor T1 is no longer saturated, bringing transistor T2 out of its saturation state. The potential of S thus decreases, causing a diminution of the current flowing through resistor R7 from S towards *b*1, and in consequence a diminution of the bias current on the base *b*1 of transistor T1. Consequently, the collector current of transistor T1 is further reduced and the same cycle of operation as above described becomes repetitive, causing a breakdown effect whereby, after a very short interval of time starting at the instant of beginning desaturation of the transistors T1 and T2, the system changes its state to zero.

Another advantage of the regenerative element represented in FIG. 1 is that its output signal has always the logical value "0" in the case where either potential source happens to fail. As a matter of fact, if there is a failure in the negative potential source, whatever be the input of the element, the emitter electrode of transistor T1 is at the potential of *e*2. It results that the base of transistor T1 can no longer be positively biased with respect to its emitter and, in consequence, transistor T1 does not conduct. Under these conditions, a bias current is no longer established on the base *b*2 of transistor T2 which is then also nonconductive. The regenerative element is always maintained in the logical state "0" as stated before.

In the case where the positive potential source at P fails, the collector of transistor T1 is connected to its emitter *e*1 through resistor R4, breakdown diode D2 which is no longer reversely biased, and resistors R5 and R6, and the collector-emitter voltage of T1 is always negative. Transistor T1 does not conduct, whether or not an information signal is present at the input E and its collector current is zero. The base of transistor T2 is then at a potential identical with that of emitter *e*2 and the transistor T2 is cut off. The output signal has still the logical value "0," whether or not an information signal is present at the input E. It is thus well established, that in the event of a failure of one of the potential sources, the output of the regenerative element according to the invention is always the logical value "0."

Another advantage of the regenerative element according to the invention is that it is effectively protected against any casual variations of the control voltage applied to the input E. The state of the element remains unchanged as long as the variations of the control voltage remain outside the switchover range of said element, that is, practically as long as this voltage has no effect upon the state of diode D1. Moreover the amplifying factor of said regenerative element is high, being that of two transistors in cascade connection, so that it will be able to feed several logical gates.

A regenerative element as above described may be associated or combined with logical circuits exhibiting AND and OR functions, said circuits incorporating diodes and resistors only.

Figure 4:
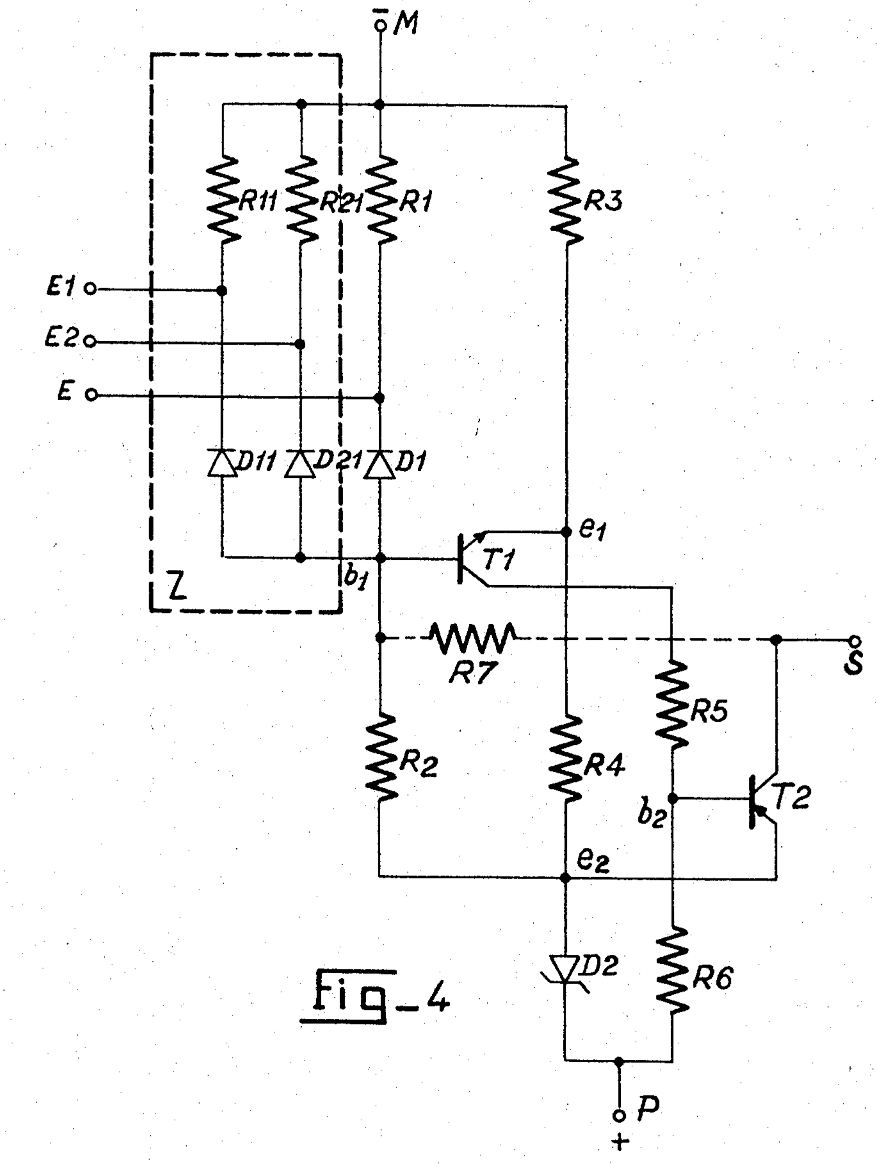
FIG. 4 is a diagram of a regenerative element enclosing an input AND circuit.

In FIG. 4, there is presented such an association of a regenerative element with an AND circuit whose input is also the input of said regenerative element. The exemplary AND circuit outlined by dotted lines, forming the block designated Z, has two inputs E1 and E2. It comprises two branches R11, D11 and R21, D21, identical with the branch R1–D1 of the regenerative element itself, these three branches being connected in parallel. These three branches R1–D1, R11–D11 and R21–D21 form a circuit with three inputs E, E1 and E2, exhibiting the logical function AND. As a matter of fact, in order to have at the output S a signal having the logical value "1," it is necessary that simultaneously the three diodes D1, D11 and D21 are conductive, that is, that an information signal be present at the same time at E, E1 and E2. Such an arrangement reduces the number of diodes necessary to form the AND circuit.

In FIGS. 5*a* and 5*b*, there is shown the association of several regenerative elements according to the invention by means of an OR circuit including only passive resistence elements, i.e. diodes and resistors. By way of example, the OR circuit schematically displayed on FIG. 5*a* has only three diodes D3, D4, D5 whose cathodes are connected to the output terminal S1, the three input terminals E13, E23 and E33 being each connected to the corresponding anodes of diodes D3, D4, D5. The logical circuit of FIG. 5*b* comprises three regenerative elements respectively designated FR1, FR2, and FR3, their output terminals being connected to the inputs E13 to E33 respectively of the logical circuit of FIG. 5*a* while a fourth regenerative element FR4 has its input terminal connected to the output terminal S1 of that circuit. In operation, it is obvious that if at least one of the regenerative elements or functional units FR1 to FR3 delivers a positive output signal, this latter is transmitted through the corresponding diode (D3 to D5) to the input of functional unit PR4 which also delivers a positive output signal, i.e. the logical value "1."

Likewise, several regenerative elements may be associated by means of AND circuits composed only of diodes and resistors and FIG. 6*a* shows such an AND circuit whereas FIG. 6*b* shows the association of three regenerative elements by means of said AND circuit. This AND circuit comprises three branches in parallel, each constituted by a diode (D6–D7–D8) in series with a resistor (R13–R14–R15), and a common resistor R12 connected to the positive terminal P of a potential source. The output terminal S2 is connected to the anodes of the diodes, and the upper terminal of each resistor is connected to the negative terminal M of the potential source. The inputs E14, E24 and E34 are respectively connected to the midpoint of each branch.

When there is no positive signal applied to terminal E14 for instance, the circuit R12, D16, R13 establishes a potential at S2 which is negative with respect to the potential at the control point or input terminal of a regenerative element. In order to have a positive signal at S2, the signals applied to inputs E14, E24, E34 must be simultaneously positive, with respect to the "control point" of a regenerative element.

By connecting, as shown in FIG. 6*b*, the terminals E14, E24 and E34 to the regenerator elements FR1, FR2 and FR3 respectively and terminal S2 to a regenerative element FR4, we can switch the functional unit FR4 to its logical state 1 by switching the functional units FR1, FR2 and FR3 simultaneously to their logical states 1.

It is also obvious from the foregoing that different other associations of logical circuits of the type above disclosed may be connected in series so as to form a logical assembly, such as that of FIG. 7 wherein the successive logical functions performed are OR, AND, OR functions. This network includes two of the branches of the system of FIG. 6*a*, having their junctions E14, E26 connected to respective input regenerators FR1, FR2 via an OR gate including diodes D1, D2, diode D8 forming part of another OR gate which feeds an output regenerator FR5 and which has another diode D9 connected to a further input regenerator FR4.

In accordance with the basic principles of the invention, there is shown in FIG. 8 a more complex logical arrangement, it being understood that the number of the logical functions and also the number of the inputs is not at all limited.

The arrangement shown in FIG. 8 is constituted by four stages I, II, III and IV of logical circuits AND and OR, a stage of AND circuits being followed by a stage of OR circuits and vice-versa, so that no successive stages can be of the same type, that is, can perform the same logical functions.

In the input stage I, the OR circuits 8–15 are those represented in FIG. 5*a*; the next stage II performs the AND function and consists of circuits 16–19 identical with that of FIG. 6*a*. The OR circuits 20, 21 of stage III are like those of FIG. 5*a* and the output AND circuit 22 of the final stage 23 is like block Z of FIG. 4, incorporated in the regenerative element FR as an input circuit thereof.

The logical equation performed by such an assembly is the following:

$$\{[(A+B)(C+D)Q]+V+[(E+F)(G+H)R]\}$$
$$W\{[(I+J)(K+L)S]+V+[(M+N)(O+P)T]\}$$

and despite the fact that this logical equation may appear somewhat complex, the corresponding logical system may be easily registered on a universal card or a printed board. The safe operation of such a system is insured even though a failure occurs in the links connecting two successive cards, owing principally to the fact that the logical circuits concerned are only made of diodes and resistors. Such a logical system may be called a "positive current-emissive system." Furthermore, the last stage constituted by the functional unit FR always delivers the logical value "0" in the case of failure of a supply lead.

FIG. 9 represents another example of a logical system wherein the resistors R12, R6', R14 and R120, R130, R140 of the passive networks X, Y, also including diodes D6, D7 and D60, D70, are given particular numerical values based on a unit value *r* as indicated in the drawing. This example intends to illustrate certain significant properties of the system according to the invention. Input terminals E, F, I are connected to paired voltage sources A–B, C–D and G–H via respective OR gates composed of diodes D3–D4, D300–D400 and D30–D40 with output terminals S1, S100 and S10.

The negative supply voltage is taken as the reference voltage and its magnitude is denoted U. An information signal of logical value "1" applied to the terminals A, B, C, D, H and J is represented by a voltage magnitude of U. When both AND circuits X and Y have no signals on their respective input terminals E, F and I, I and J, the potential of their output terminals G and K is $U/7$. The output signal is then the logical value "0." The next to last circuit is followed by a functional unit FR, only the NPN-type input transistor T1 thereof being shown in this figure. When in a nonconductive state, the transistor T1 has its emitter electrode at a potential $U/2$. It is then necessary to have at the output K a signal having a potential higher than $U/2$ in order that the regenerative element delivers an output signal "1." From the consideration of the first AND circuit X, it is seen that if only one input E or F receives a voltage signal U, the corresponding diode D6 or D7 is blocked. The potential at the output terminal G is then $U/4$ and the output signal at G is "0." If it is assumed that the signal at terminal H is "0," and at terminal J, this signal is either "1" or "0," the second AND circuit Y delivers at its output terminal K a voltage of magnitude $U/4$ or $U/7$. The output signal is then also "0."

If the signal at terminal H is "1," it is necesary and also sufficient that the signal at J is equal to "1" in order that both diodes D60 and D70 of the second AND circuit Y are blocked and consequently the signal at terminal K be equal to U and the output signal be equal "1."

If it is now assumed that the first AND circuit X receives at its inputs E and F two signals "1," both its diodes D6 and D7 being blocked. If the signal at H is "0," the signal at J being also "0," the signal appearing at I from circuit X is $3U/4$. The corresponding diode D60 in the second AND circuit Y is blocked and the voltage at terminal K is $U/4$. The output signal has then the logical value "0." On the other hand, if, with terminal H still at "0" potential, the signal at J is "1," the corresponding diode D70 is blocked and the voltage at terminal K is substantially $3U/4$, the output signal having the logical value "1." The above description demonstrates that the logical system of FIG. 9 solves the logical equation $S=[(A+B)\cdot(C+D)+H]J$, S being the final output.

It is clear also from the above detailed description that if a failure occurs at any point of the system, such as a breaking in a supply lead from an OR gate to an AND gate, the logical value "1" being always marked by a current flow, the output signal of said AND circuit in such a case will always have the logical value "0." If the breaking of a lead takes place between two stages following each other, the logical system will never deliver an output signal having the logical value "1" if the solution of the equation must be "0" at that time. It results from the preceding considerations that if this logical system is used to operate an actuation, the latter will never be operated if the logical data are not such as to command such actuation, even though breakings, failures or contact faults occur in the system.

The logical system according to the invention has a further advantage over prior-art logical systems, i.e. that it may perform a logical equation, even a complex one without necessitating any transformation of the terms of said equation, the different AND and OR circuits performing directly and successively all the operations involved. More specifically, the logical system of the invention is useful in the field of automation, whenever the operation of actuating means is controlled by a complex logical equation involving multiple terms corresponding to numerous data. FIG. 10 represents the schematic diagram of the control means for such an actuator. This actuator 100 is designed to operate under the control of input signals, which may be either commands 300 or data previously stored at 400, and also under safety conditions established by a unit 200. A single regenerative element or functional unit FR7, preceded by OR and AND gates 500 and 600, suffices to transmit to the actuator 100, the solution of the logical equation.

It will be understood that numerous modifications may be introduced into the exemplary embodiments described and shown herein without departing from the scope of the invention.

What I claim is:

1. A signal intensifier comprising:

a network composed of passive resistance elements forming a plurality of junctions, said elements including at least one diode;

transistor means having two input electrodes respectively connected to two of said junctions;

a supply of direct current connected to said network with a polarity making said transistor means conductive in a predetermined state of conductivity of said diode;

a source of input signals operative to bias said diode selectively into said predetermined state and an alternate state of conductivity in which said transistor means is nonconductive;

and output means energizable by said transistor means in the conductive condition thereof, said output means being provided with regenerative connection for driving said transistor means to saturation upon a biasing of said diode into said predetermined state.

2. A signal intensifier as defined in claim 1 wherein said transistor means comprises a two-stage amplifier including a first stage provided with said input electrodes and a second stage provided with an output electrode, said regenerative connection comprising resistance means connected between said output electrode and one of said input electrodes.

3. A signal intensifier as defined in claim 2 wherein said first and second stages are of different conductivity types, said output electrode being a collector, said one of said input electrodes being a base.

4. A signal intensifier as defined in claim 2 wherein said elements include a breakdown-type diode connected in series with said second stage to a pole of said supply, said output electrode being connected to the other pole of said supply.

5. A signal intensifier as defined in claim 4 wherein said elements form four arms of a resistance bridge, said two of said junctions being located at opposite ends of a diagonal of said bridge, said supply being connected across the other diagonal of said bridge in series with said breakdown-type diode, the latter being oriented to limit current flow through said bridge in the nonconductive condition of said transistor means.

6. A signal intensifier as defined in claim 5 wherein said second stage has an input circuit including a biasing resistor in shunt with said breakdown-type diode, said biasing resistor forming part of a voltage divider further including a coupling resistor between said first and second stages.

7. A signal intensifier as defined in claim 1 wherein said elements form four arms of a resistance bridge, said two of said junctions being located at opposite ends of a diagonal of said bridge, said supply being connected across the other diagonal of said bridge, said elements including a further diode connected between said other diagonal and a pole of said supply.

8. A signal intensifier as defined in claim 7 wherein said further diode is a Zener diode oriented to block current flow through said bridge in the nonconductive condition of said transistor means.

9. In combination, a signal intensifier as defined in claim 1 and at least one passive logic network in cascade therewith, said logic network forming part of said source of input signals.

10. The combination defined in claim 9 wherein said logic network consists exclusively of resistor means and diode means.

No references cited.

ARTHUR GAUSS, *Primary Examiner.*

R. H. PLOTKIN, *Assistant Examiner.*